United States Patent [19]

Harris, Jr.

[11] Patent Number: 4,875,427

[45] Date of Patent: Oct. 24, 1989

[54] BOAT FENDERS WITH INTERNAL ROPE STORAGE CAPACITY

[75] Inventor: Rano J. Harris, Jr., Baton Rouge, La.

[73] Assignee: Romar Technologies, Inc., Baton Rouge, La.

[21] Appl. No.: 279,516

[22] Filed: Dec. 5, 1988

[51] Int. Cl.$^4$ ............................................. B63B 59/02
[52] U.S. Cl. ..................................... 114/219; 114/343
[58] Field of Search ........................................ 441/3-5; 114/219, 218, 343, 345, 230; 405/212, 213

[56] References Cited

U.S. PATENT DOCUMENTS

| | | | |
|---|---|---|---|
| 3,026,548 | 3/1962 | Dollinger | 441/115 |
| 3,950,806 | 4/1976 | Puchois | 441/3 |
| 4,788,926 | 12/1988 | Ullman et al. | 114/219 |

Primary Examiner—Joseph F. Peters, Jr.
Assistant Examiner—Edwin L. Swinehart
Attorney, Agent, or Firm—Llewellyn A. Proctor

[57] ABSTRACT

A boat fender provided with internal capacity for storage of the rope from which it is normally suspended when in use. A mechanism is also provided retaining the rope when it is in storage, and for quick release of the rope when it is withdrawn from storage for use in suspending the boat fender.

12 Claims, 4 Drawing Sheets

BOAT FENDERS WITH INTERNAL ROPE STORAGE CAPACITY

FIELD OF THE INVENTION

This invention relates to an improved boat fender. In particular, it relates to a boat fender provided with internal rope storage capacity, and associated means for the quick facile storage of rope within the boat fender, and release of same for normal use of the boat fender.

BACKGROUND

It has long been the practice in the operation of working craft, i.e., fishing boats, tugboats, trawlers, and the like, to employ "boat fenders" constituted of old automotive tires hung from the deck by ropes to prevent contact between the hull and the dock, or wharf, to which the boat is moored. On pleasure crafts, and yachts, more sophisticated devices are used for this purpose although the serve precisely the same function, or purpose. Presently used boat fenders are of many colors, shapes and designs. Typically boat fenders are of elongate shape and the outer surface esthecally pleasing to the eye. Boat fenders are commonly constructed of an elastomeric material, typically a flexible or semi-flexible plastic, e.g., a heavy gauge polyvinyl chloride resin; sometimes with solid polyvinyl chloride ends for reinforcement. Most are inflatable to better absorb shocks, bumps or jolts. Most are designed, or shaped to roll instead of rub to maximize protection to the hull. Some are covered to protect the fender itself, thus providing protection for both the fender and the hull. Many are designed to hang vertically, horizontally, or for stringing together to replace fender boards.

The difficulty with present boat fenders is that the rope hangs onto the deck after an end is tied to a rail, post or cleat. The extra length of rope hangs onto, or is piled upon the deck thus presenting at best an unsightly appearance, and always a hazard to passersby. Fender mounts, wherein the boat fenders are offset away from passageways only a partial solution to this problem. Thus, even when the boat fenders are removed for storage in lockers, or fender racks, the loose lengths of rope used for attaching the fenders to the rail, post or cleat, present an unsightly appearance, as well as a tripping hazard.

OBJECTS

It is, accordingly, a primary object of this invention to provide a boat fender having internal rope storage capacity.

In particular, it is an object to provide a boat fender providing the desirable functions of present boat fenders of advanced design, but having in addition an internal capacity for storing rope.

A further and more specific object is to provide means for latching or securing the rope in place within its internal storage area, and means for quick facile release of the stored rope when need for the stored rope arises.

THE INVENTION

These objects and others are achieved in accordance with the present invention, characterized as apparatus embodying a boat fender provided with an internal chamber within which rope can be stored, and preferably also associated means for quick facile input of rope to the chamber, and release of a predetermined length thereof for normal use of the boat fender.

The boat fender, which in normal use is hung by a rope from a hitching device alongside the hull of the craft, is comprised of an enclosing shell, or wall, providing a body of three-dimensional shape, the external surface of which contacts the mooring site for protection of the hull. An internal chamber, or chamber located within the confines of the enclosing wall, is adapted to contain rope in excess of that used for suspension of said boat fender, as well as to provide storage for the rope when the boat fender is not in use.

The characteristics of preferred boat fenders, and their principle of operation, will be more fully understood by reference to the following detailed description, and to the attached drawings to which reference is made in the description. The various features and components in the drawings are referred to by numbers, similar features and components being represented in the different views by similar numbers. Subscripts are used in some instances with numbers, and with numbers and letters, where there are duplicate features and components, or to designate a sub-feature or component of a larger assembly.

Figure 1:
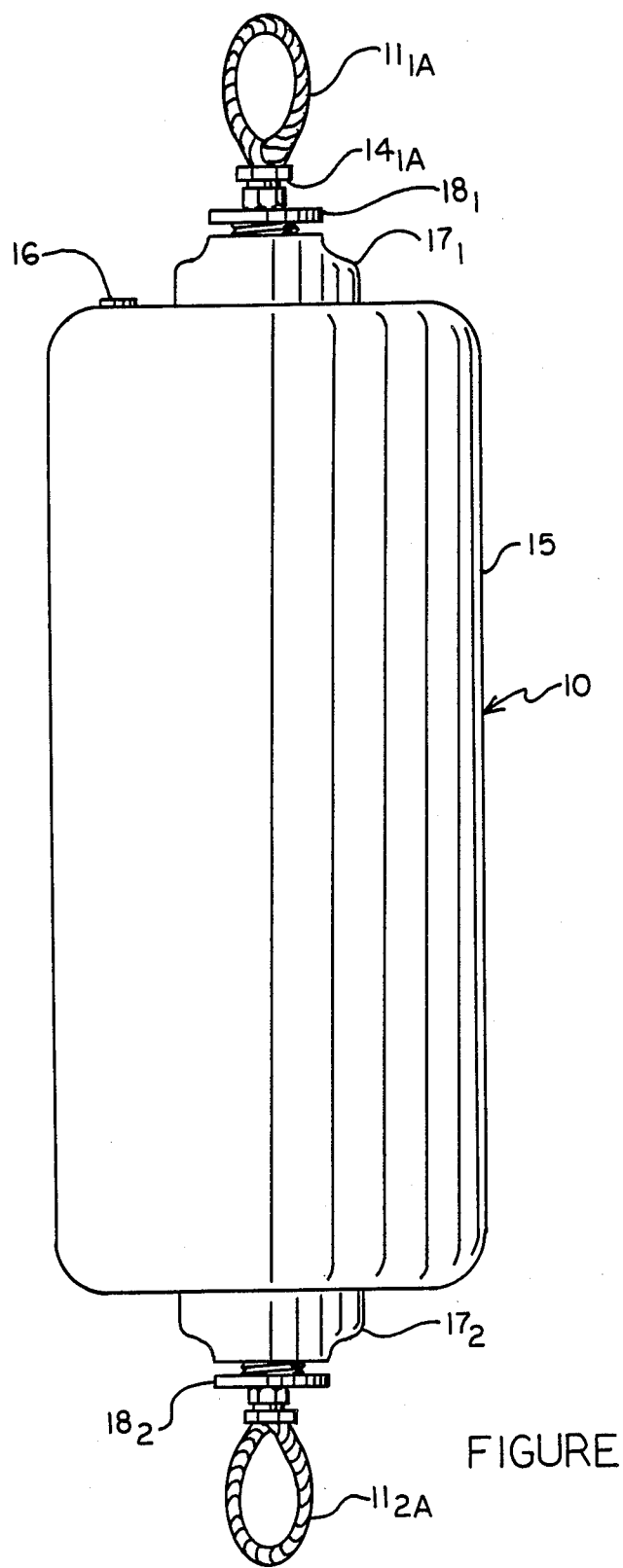
FIG. 1 depicts in perspective in perspective a boat fender of elongate shape provided with internal rope storage chambers, one located at each end of said boat fender.
Figure 2:
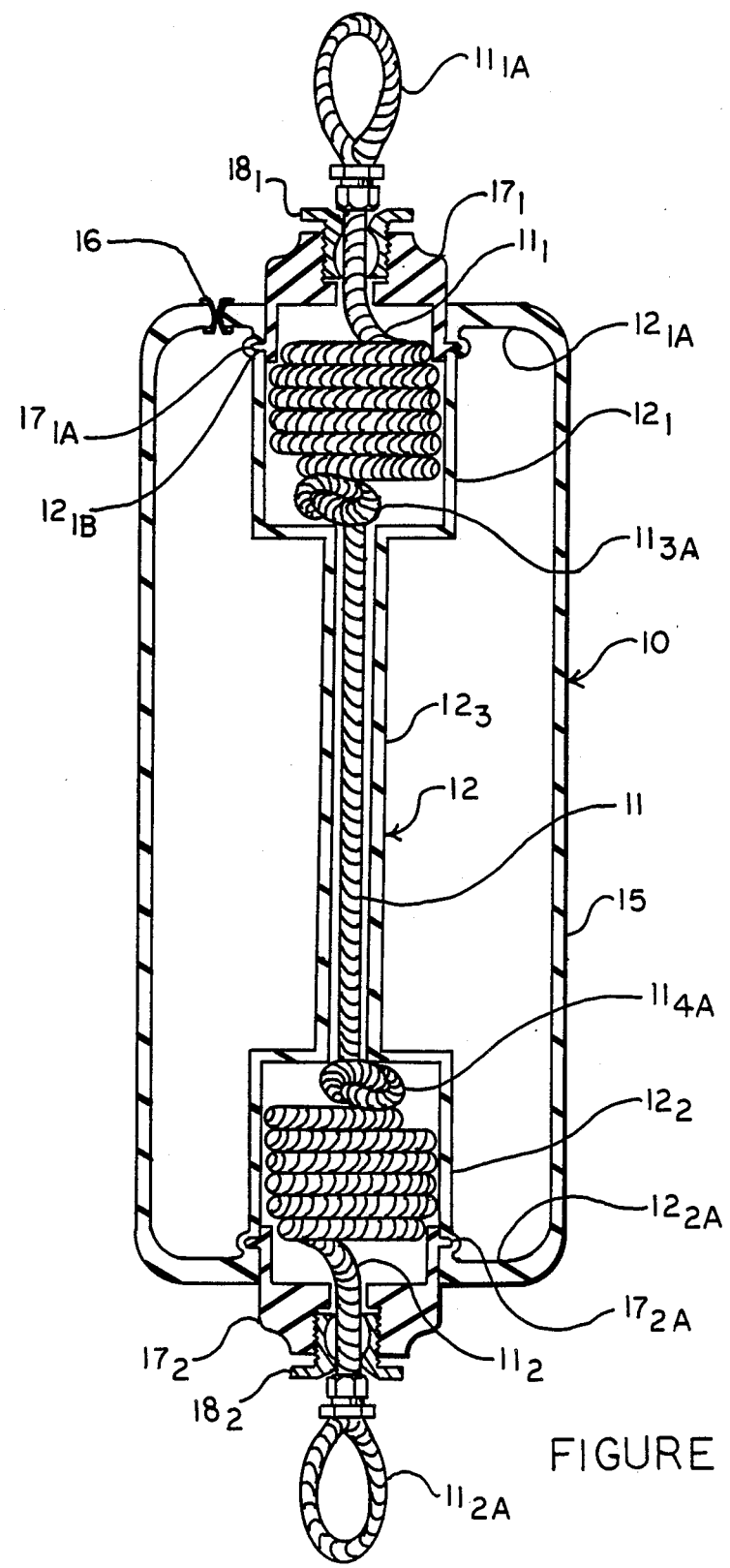
FIG. 2 is a cross-sectional view of the boat fender depicted by reference to FIG. 1, showing the two internal rope storage chambers.
Figure 3:
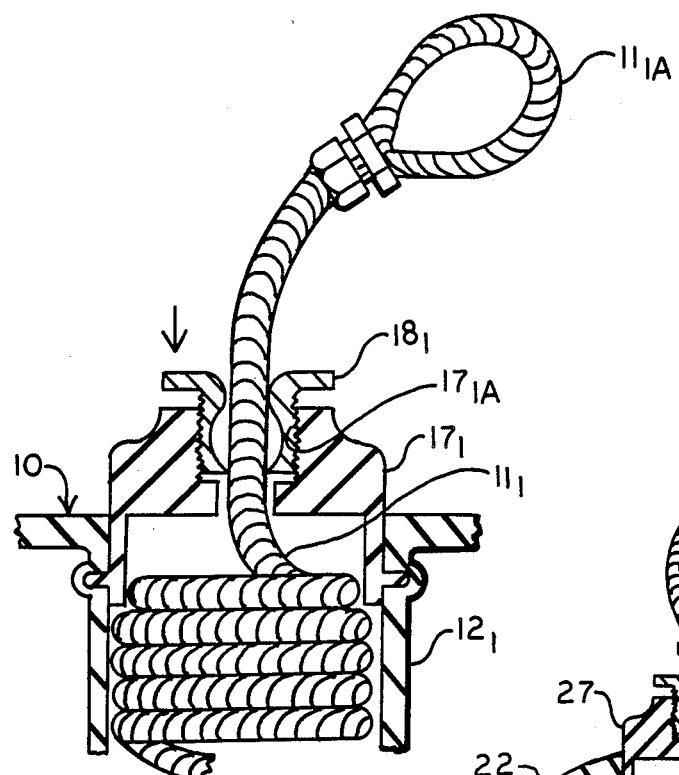
FIG. 3 depicts a fragmentary sectional view of one of the internal rope storage chambers inclusive of a latching mechanism for securing a section of the rope in place within a storage chamber, and release of the stored rope as required.

Referring to the drawings, reference is first made to FIGS. 1-3; initially to FIGS. 1 and 2, generally. FIGS. 1 and 2 show a preferred type of boat fender 10 of elongate shape from the two ends of which a section of rope $11_1$, $11_2$, respectively, can be withdrawn for suspension of the boat fender 10 alongside the hull of a craft (not shown). for vertical suspension of the boat fender 10 from the deck of a craft, a needed length of one segment of the rope 11 can be released from its internal chamber, e.g., $12_1$, and its terminal end, e.g., $11_{1A}$, secured to a post, rail, cleat, or other hitching device located on the deck of the craft. For horizontal suspension of the boat fender 10 from the deck of the craft, the needed lengths of rope $11_1$, $11_2$ are released from both internal chambers $12_1$, $12_2$ and the ends $11_{1A}$, $11_2A$ are secured to a post, rail, cleat, or hitching device on the deck of the craft. Two or more of the boat fenders can also be strung together end-to-end to form fender boards.

The outside surface of a boat fender 10 can be of virtually any texture, color, or design; and the shape can vary widely. An elongate shape is very practical, and generally preferred. Circumferential vertically oriented projections along the outside surface of a boat fender 10 are often provided, as depicted in FIG. 1, to aid in causing the boat fender 10 to roll rather than rubbing when contact is made between the boat fender and a mooring site.

Reference is specifically made to FIG. 2. The core portion of the boat fender 10 is constituted of an inner tubular structure 12, located concentrically within a surrounding outer wall 15. The tubular structure 12 includes a small diameter central portion $12_3$, and large diameter end portions $12_1$, $12_2$ providing internal chambers within which lengths of rope $11_1$, $11_2$, respectively, can be stored. It will be understood, however, that the tubular structure 12 could be of uniform diameter from end to end to provide a single non-compartmented chamber; or, in a less preferred form, omitted altogether and the rope stored within the confines of the surrounding outer wall 15, also providing in effect a single non-compartmented chamber. It will be observed, in the embodiment shown, tht the rope 11 extends through the tubular structure 12 but is knotted, for convenience, on the two sides of the small diameter central portion $12_3$ of the tubular structure to permanently anchor the rope 11 in place. Thus, the knots $11_{3A}$, $11_{4A}$ can serve to anchor the rope in place, effectively causing the rope to function as two independent units, a first rope segment $11_1$ located in chamber $12_1$ and anchored via an end thereto, and a second rope segment $11_2$ located in chamber $12_2$ and anchored via an end thereto. In other words, a rope segment (e.g. $11_1$) can be withdrawn from its respective chamber (e.g. $12_1$) to the full extent of the length stored within its respective chamber, and thereafter it will remain secured to the chamber because it is held therein via a knotted end of the rope (e.g., $11_{4A}$) which cannot pass through the small diameter central portion $12_3$ of the tubular structure 12. It is, of course, apparent that other means of securing the rope segments in place within the tubular structure 12 are possible; and it is not essential that the length of rope be segmented in this fashion at all. The two terminal ends of the rope 11 are formed as permanent loops $11_{1A}$, $11_{2A}$. The boat fender 10 is preferably formed as a unitary structure, as shown; the wall 12, 15 being molded to form a unitary component upon which the covers $17_1$, $17_2$ are affixed. The boat fender 15 can be inflated via the introduction of pressurized gas into the bag via the gas needle valve 16.

Reference is made to FIGS. 2 and 3. Covers $17_1$, $17_2$ of tubular shape, each of which is provided with an internally threaded inwardly converging central opening, are fitted over the end of each of chambers $12_1$, $12_2$, respectively, an external projecting ring $17_{1A}$, $17_{2A}$ located on the lower side of each extending into and locking within a snap groove $12_{1A}$, $12_{2B}$, respectively, located on the inside face of enlarged tubular segments $12_1$, $12_2$. Within the internally threaded inwardly converging openings of chamber covers $17_1$, $17_2$ there is fitted an externally threaded tubular rope locking plug $18_1$, $18_2$ constituted of a flexible material. The plugs $18_1$, $18_2$, in concert with the inwardly tapered, or inwardly converging, internally threaded openings of the chamber covers provides, as the plugs 18 are moved upwardly or downwardly, a means for securing a section of the rope in place within the storage chamber, as well as means for quick facile release of the section of rope when required. Rotation and downward movement of a plug $18_1$ within an inwardly tapered interally threaded opening $17_{1A}$, as best shown by reference to FIG. 3, thus forces the lowermost wall portion of the plug $18_1$ to toe inwardly against the rope $11_1$ to securely bind, or lock, the latter in place. Conversely, upward movement of the plug $18_1$ within the opening $17_{1A}$, by rotation of the plug in an opposite direction, would cause the toe to move outwardly and release its grip upon the segment of rope $11_1$. Thus, upward movement of the plug $18_1$ would allow the segment of rope $11_1$ to be pushed into the chamber $12_1$ for storage, or withdrawn for measuring out for use a desired length of rope. Downward movement of the plug $18_1$ would lock a withdrawn portion of the rope $11_1$, of predetermined length, for use. The excess rope would be stored within chamber $12_1$.

Figure 4:
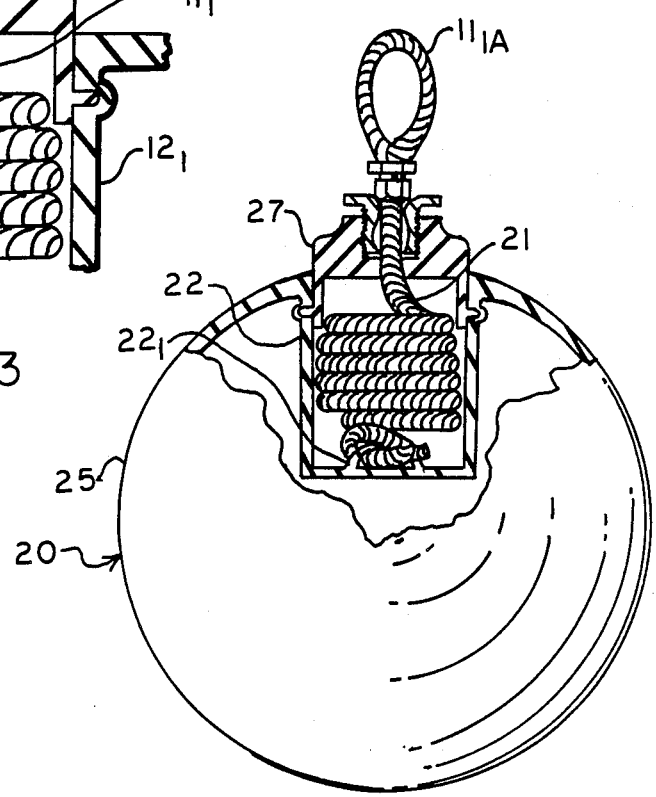
FIG. 4 depicts in partial section a boat fender of spherical design, inclusive also of an internal rope storage chamber with a latching mechanism for securing a section of the rope in place within the storage chamber, and release of the stored rope from the chamber as required.

FIG. 4 depicts a boat fender 20 of spherical design, inclusive of a rope storage chamber. The rope storage chamber is similar to those described by reference to FIGS. 1 through 3 with the exception that the chamber 22 is closed at the bottom and provided with ring $22_1$ affixed thereto to which a terminal end of the rope 21 can be secured. The chamber cover 27, with its internally threaded inwardly converging externally threaded tubular plug 28 is similar in design and function to those described by reference to FIGS. 1 through 3, and these members are similarly affixed upon the chamber 22. A shell 25 of flexible or semi-flexible material forms a unitary body with the rope storage chamber 22. The shell 25 and chamber 22 are generally formed as molded components, and where an inflatable boat fender is desired, then a gas needle valve (not shown) is included within the wall of the boat fender for injection of a pressurized gas.

Figure 5:
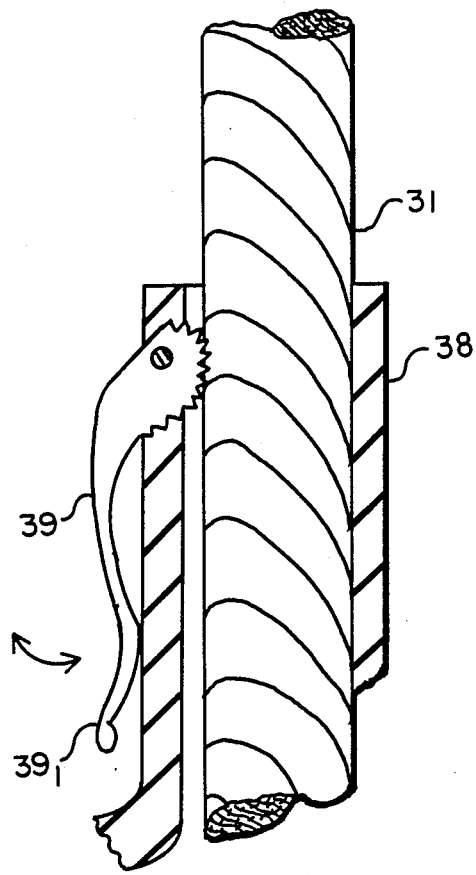
FIG. 5 depicts in fragmentary section a second type of rope latch and release mechanism for use with an internal rope storage chamber.

FIG. 5 depicts another type of rope locking and release means. In the device described by reference to the figure, the rope is clamped, or locked, when the lever is raised. The tubular segment 38 thus represents a rope exit port, such as would be located atop a chamber unit of a boat fender within which a segment of rope 31 is stored. A notched lever 39, or pair of levers (not shown) alternately disposed, mounted via its notched end within the tube wall 38 tightly engages the rope 31 when the handle $39_1$ is moved downwardly against the tubular wall; and, conversely, releases its grip upon the rope 31 when the handle $39_1$ is pushed in the opposite direction away from with the wall. In the specific embodiment shown in this Figure, a single lever 39 pushes the rope against the opposite wall when the handle $39_1$ is moved downwardly against the tubular wall. Conversely, its grip on the rope 31 is released when the handle $39_1$ is moved outwardly away from the tubular wall.

Figure 6:
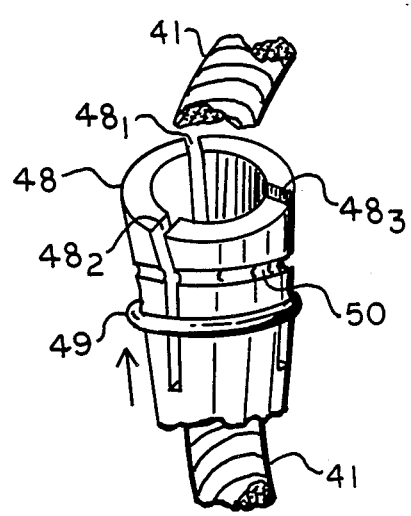
FIG. 6 depicts in fragmentary section a third type of rope latch and release mechanism for use with an internal rope storage chamber.

The embodiment depicted by reference to FIG. 6 represents another form of a rope locking and releasing mechanism which can be mounted above a rope storage chamber. In this embodiment the tubular member 48 likewise represents a rope exit port at the top of a rope storage chamber. The tubular member 48, it will be observed, is provided with longitudinal slits $48_1$, $48_2$, $48_3$ providing spaces into which the three fingers formed by the slits $48_1$, $48_2$, $48_3$ can be squeezed, and the fingers thereby pressed as a collet against a rope passed therethrough. The tubular member 48, or collet, is also provided with a circumferential groove 50 into which a ring 49 can be raised. In this type device a segment of rope 41 is thus engaged and held in fixed position when the ring 49 is raised and positioned in the groove 50 as shown in the figure, and released when the ring 49 is lowered or moved out of groove 50 downwardly upon the tubular segment 48.

Various modifications and changes can be made of the boat fender, and associated means for the introduction and storage of rope and release of rope from within the rope storage chamber of the boat fender, without departing the spirit and scope of this invention, as will be apparent to those of skill in this art.

Having described the invention, what is claimed is:

1. A boat fender for suspension from a rope alongside the hull of a craft from a hitching device located on the craft for protection of the hull on contact thereof with a mooring site, which comprises
   a body constituted of an enclosing wall providing an object of three-dimensional shape, the external surface of which can contact said mooring site for protection of the hull,
   a chamber located within the confines of the enclosing wall of said body for containment and storage of the suspending rope when the boat fender is not in use.

2. The apparatus of claim 1 wherein the enclosing wall is constituted of a flexible material, which provides the rope storage chamber, and the wall is provided with a gas inlet valve for introducing gas internally into the confines of the wall to inflate the enclosure formed by said enclosing wall.

3. The apparatus of claim 1 wherein the chamber further includes associated means for the quick facile introduction of rope into said rope storage chamber for storage, and release of a predetermined length of rope for normal use of the boat fender.

4. The apparatus of claim 1 wherein the boat fender is of elongate shape, and an internal rope storage chamber is located within a chamber located in each of the two ends of said elongate boat fender.

5. The apparatus of claim 1 wherein the boat fender is of spherical shape.

6. A boat fender for suspension from a rope alongside the hull of a craft from a hitching device located on the craft for protection of the hull on contact thereof with a mooring site, which comprises
   a tubular body, a terminal end of which is open to form a chamber for containment and storage of the suspending rope,
   a wall enclosing and adjoined upon said tubular body, the external surface of which can contact said mooring site for protection of the hull, and
   means associated with said chamber for the quick facile introduction and storage of rope, and for securing and releasing of same from within the chamber for normal use of the boat fender.

7. The apparatus of claim 6 wherein the tubular body is constituted of a small diameter central portion, and the terminal ends thereof are of large diameter forming two rope storage chambers.

8. The apparatus of claim 6 wherein the tubular body is constituted of a small diameter central portion, the terminal ends thereof are of large diameter forming two rope storage chambers, a single length of rope is extended through the tubular body and knotted on a side of said small diameter central portion of the tubular body to anchor the rope in lace leaving the two ends of the rope available for suspension of the boat fender, and for storage of rope within the rope storage chambers.

9. The apparatus of claim 6 wherein the enclosing wall is constituted of a flexible or semi-flexible material, providing an outer shell, and the shell is provided with a gas inlet valve for introducing gas internally into the confines of the wall to inflate outer shell.

10. The apparatus of claim 6 wherein the means associated with said chamber for the quick facile storage of rope, and release of same for normal use of the boat fender, is characterized as a cover the center of which is provided with an internally threaded inwardly converging opening within which an externally threaded tubular plug, through which the rope is passed, is projected and threadably engaged, such that inward movement of the plug, after withdrawal of a segment thereof needed for use in the suspension of the boat fender, can be tightly secured due to toe in of the bottom portion of the plug agains the rope, and released by movement of the plug in the opposite direction.

11. The apparatus of claim 6 wherein the means associated with said chamber for the quick facile storage of rope, and release of same for normal use of the boat fender, is characterized as a tubular section located above said rope storage chamber through which said rope is passed and a notched lever is mounted thereon such that, movement of the lever in one direction will clamp the rope tightly within the tubular section, and movement of the lever in the opposite direction will release the rope and permit its movement through the tubular section out of said chamber.

12. The apparatus of claim 6 wherein the means associated with said chamber for the quick facile storage of rope, and release of same for normal use of the boat fender, is characterized as a tubular section located above said rope storage chamber through which said rope is passed, an end of said tubular section being provided with a plurality of longitudinal slits forming fingers which can be displaced into the openings provided by said slits, a circumferential groove about the upper side of said fingers, and a ring which can be displaced upwardly into said circumferential groove to tighten said fingers upon the rope within said tubular section, and downwardly out of the circumferential groove to release the rope and permits its movement through the tubular section out of said chamber.

* * * * *